Dec. 9, 1941.    J. W. OSBORNE    2,265,699
MEANS FOR TEACHING ARITHMETIC
Filed June 23, 1939    2 Sheets—Sheet 1

Inventor
Jewell W. Osborne
By J. Stanley Burch
Attorney

Dec. 9, 1941.   J. W. OSBORNE   2,265,699
MEANS FOR TEACHING ARITHMETIC
Filed June 23, 1939   2 Sheets—Sheet 2

Mary, John, and Jim do not like figures,

Now let us show them how much fun we can be.

Here we go;  is first;

Together we are  you see.

Then put us together and are 3

Add:  and   and you have

Look! Can't you see, we are really alive?

Inventor
Jewell W. Osborne
By Stanley Burch
Attorney

Patented Dec. 9, 1941

2,265,699

UNITED STATES PATENT OFFICE 2,265,699

MEANS FOR TEACHING ARITHMETIC

Jewell White Osborne, Brownsville, Tex.

Application June 23, 1939, Serial No. 280,858

2 Claims. (Cl. 35—31)

This invention relates to a novel means for teaching arithmetic by visual demonstration.

An object of the present invention is to provide a means of the above kind which includes figure toys whose body portions are in the form of numerals used in carrying out the arithmetical operations, thereby affording means for teaching by a method which is highly efficient and especially interesting to children when learning the common processes of arithmetic such as are taught in the elementary and primary schools.

More particularly, the present invention contemplates means for use in carrying out a method of the above kind in which written or printed verses are provided dealing with certain arithmetical operations and in which blank spaces are left for reception of the numerals involved in such operations, the numeral-simulating toy figures being adapted to be moved into the blank spaces for completing the verses as the teaching of the arithmetical operations proceeds.

The present means may be used in a method carried out by direct exhibition, or by the projection of a moving picture of the exhibition on a screen.

The exact nature of the present means will become clearly apparent from the following description when considered in connection with the accompanying drawings, in which.

Figure 1:
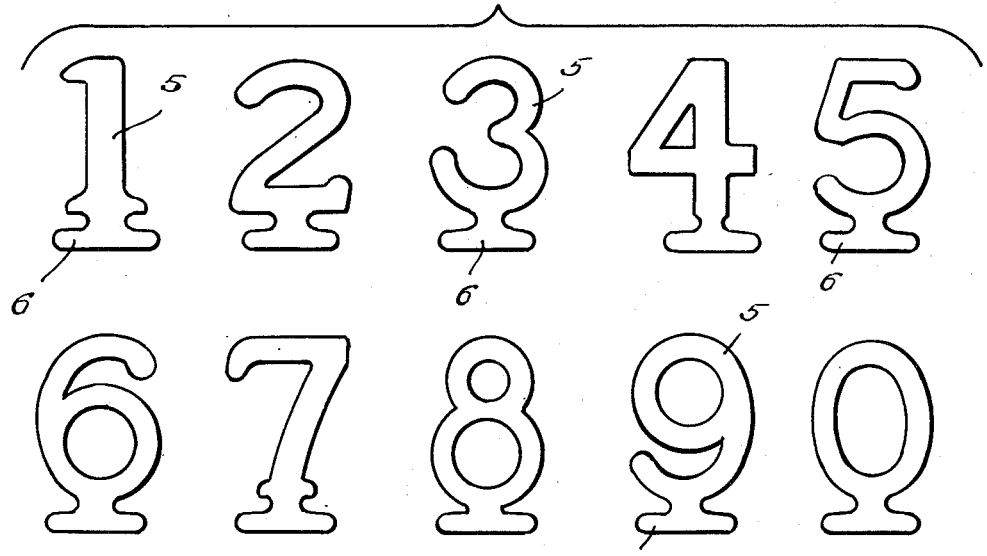
Figure 1 is a view showing a group of numeral pieces corresponding to the eleven fundamental values and formed so as to be readily adaptable for use in constructing numeral-simulating figure toys in accordance with the present invention.
Figure 2:
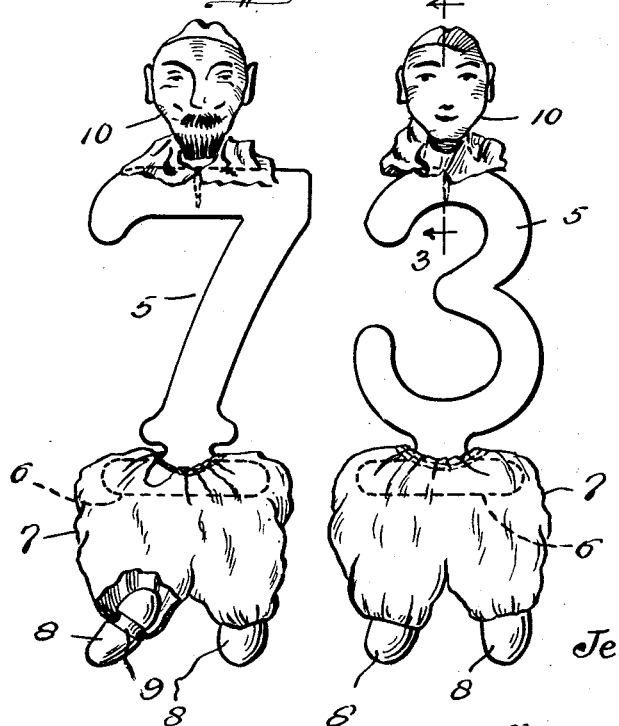
Figure 2 illustrates two of the figure toys completed with numeral pieces of the form shown in Figure 1.
Figure 3:
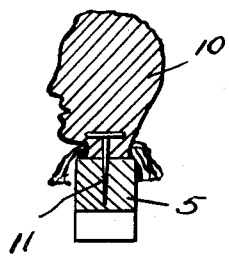
Figure 3 is a fragmentary section on line 3—3 of Figure 2.

Referring in detail to the drawings, I provide a set of figure toys whose body portions are in the form of number pieces, the number pieces of the set including the eleven fundamental values. As shown, each number piece 5 is provided with a bottom extension including a cross bar 6, and shirred on this cross piece is the top portion of a bifurcated garment 7 having feet simulating blocks or members 8 secured to the lower ends of the legs thereof as by shirring the bottom edges of the legs in grooves 9 of the members 8. Each figure is completed by attaching a head simulating member 10 to the top of the numeral piece 5, as by means of a tack or like fastener 11 carried by the head simulating member 10 and driven into the top of the numeral piece 5 as shown clearly in Figure 3.

Figure 4:
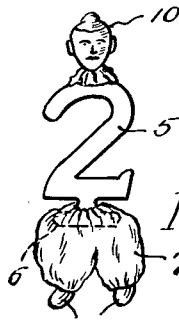
Figure 4 shows a verse of poetry having figure toys made according to the present invention moved into place within the blank spaces of such verse to complete the arithmetical operations referred to in the verse.
Figure 4:
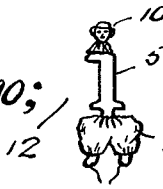
Figure 4:
Figure 4:
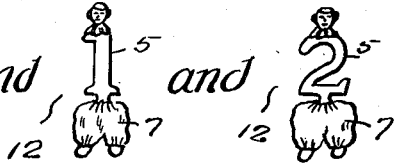
Figure 4:
Figure 4:
Figure 4:
Figure 4:

Referring to Figure 4, the verse, which may be on a suitable surface S in either prose or poetry, may refer to certain numerals and arithmetical operations performed by the use thereof. As shown, blank spaces are normally left as at 12 to receive the desired numeral simulating figure toys. Assuming that the operation will first involve the numerals 1 and 2, the numeral 1 may be placed in the first space 12, and the following space may be adapted to receive both of the numerals and to illustrate what they represent when placed side by side. The verse may then proceed to illustrate addition and the result formed by the use of these two numbers when added, and so on.

When teaching of arithmetic is carried out by the means above described, the pupil's interest is aroused so that the pupil obtains full knowledge and benefit of the teaching. Obviously, the teaching of fractions may be carried out by simply placing an inclined line in the blank spaces for reception of figures above and below such line. Still further, these spaces may receive percent signs for association with suitable numerals in teaching percentage.

It is believed that the nature and advantages of the present invention will be readily understood and appreciated by those skilled in the art, and slight changes in the construction of the numeral simulating figures may obviously be made without departing from the spirit and scope of the invention as claimed.

What I claim as new is:

1. As a means for teaching arithmetical operations by visual demonstration, a numeral simulating figure having a body portion in the form of a numeral, a head simulating member attached to the top of said numeral simulating body, and a garment member attached to the bottom of said numeral simulating body.

2. As a means for teaching arithmetical operations by visual demonstration, a numeral simulating figure having a body portion in the form of a numeral, a head simulating member attached to the top of said numeral simulating body, and a garment member attached to the bottom of said numeral simulating body, said numeral simulating body having a bottom extension including a cross bar, and the top of said garment being shirred around said cross bar for attachment of the same to the body.

JEWELL WHITE OSBORNE.